UNITED STATES PATENT OFFICE.

THOMAS MILTENBERGER, OF BELLEFONTAINE, OHIO.

IMPROVEMENT IN COMPOUND PHOTOGRAPHS.

Specification forming part of Letters Patent No. 20,213, dated May 11, 1858.

*To all whom it may concern:*

Be it known that I, THOMAS MILTENBERGER, of Bellefontaine, in the county of Logan and State of Ohio, have invented and used certain new and useful Improvements in Photographic Pictures on Glass, which I term the "Compound Photograph;" and I do hereby declare that the following is a full, clear, and exact description of the same.

My improvements relate more especially to the production of an image or figure on one side of a plate of glass and the production on the opposite or reverse side of the same plate of a landscape or other view or scene, thus making a most novel and truly artistic photograph, and possessing the double magical effect of a stereoscopic figure and stereoscopic scene all on one single plate of glass—an effect which it is believed has never before been produced.

My process or mode is as follows, viz: Having a glass plate collodionized and sensitized, as is usual in taking an ambrotype impression, I arrange the subject to be copied before a perfectly-black background and proceed in the usual manner with the application of the camera. After the impression is taken, it is developed, fixed, and washed as any other collodion picture. This impression, when viewed by transmitted light, is transparent, except in the high lights thereof. The impression must then be coated over on the reverse surface or back part of the figure with a thick smooth deposit of black varnish, the varnish not to extend beyond the outlines of the figure or impression. The varnish can be applied readily with a suitable brush, and in proportion to the thickness of the deposit of varnish, so in proportion will the picture or impression be increased in roundness or relief; and, in addition to the thick deposit of varnish, so also will the effect be increased with the thickness of glass plate used for the impression. After thus having varnished and colored the picture, and the black varnish has sufficiently dried, a coat or film of collodion gilding, or diamond varnish is to be floated over the collodion or impression side of the glass, and after this last has perfectly dried care must be observed that the whole of the back part of the glass plate is perfectly clean, when next proceed to coat over with a collodion deposit the whole of the back or reverse side of the picture, and proceed to take on this last-coated surface an impression of any desired scene or view to form a background for the image or first impression, employing, of course, the camera as at first. After the plate is taken from the camera it must be immersed in a silver bath, and thus the glass plate or tablet presents to view the novel and beautiful result of a compound impression of a figure and landscape or view, both impressions being produced on one and the same plate, on opposite sides or surfaces, with accurate focal and compound stereoscopic effect. After the scenic or last impression is taken it may be colored, if desired, and backed up with a deposit of black or asphaltum varnish or with any opaque material, paper, or cloth, when the whole picture is provided with a suitable matting and front glass and preserver, and incased or framed as is usual.

It may be well enough to state that in no instance in my process is the collodion film detached, as might be supposed from the translucent appearance of the surface of the glass surrounding the image or impresssion part.

I am well aware that many attempts have been made to produce a stereoscopic effect upon a flat surface or simple medium of a glass plane or transparent tablet without the aid of lenses or other combined optical media; and I am also aware that for such purposes the collodion surface surrounding the image-part of a picture or glass has been detached, and the back part as well as the collodion surface of the impression coated over with black varnish, as in some of the crystalotype processes, and in the hallotype process double and triplicate fac-simile impressions or scenes and images have been combined together; and I am also aware that printed or engraved impressions have been combined with impressions on glass; but none of the above processes or combinations do I claim; but What I do claim as new and of my own invention, and desire to have secured by Letters Patent of the United States, is—

The production of a compound photograph or the taking of separate distinct photograpic impressions on each side of a glass plate or transparent tablet and producing thereby a compound-relievo or double stereoscopic effect on a single or simple plane or flat surface in combination with a totally-black background, through which solely is produced a transparent collodion film, in the manner substantially as set forth and described.

THOMAS MILTENBERGER. [L. S.]

Witnesses:
M. WARREN,
GOTTLOB RESENE.